Aug. 4, 1970  J. H. HUFFORD  3,522,458
STARTING CIRCUIT FOR ENERGIZING A LOAD IN
SYNCHRONISM WITH LINE FREQUENCY
Filed Dec. 29, 1966

INVENTOR.
JAMES HOWARD HUFFORD

BY
Meyer, Tilberry & Body

ATTORNEYS

United States Patent Office 3,522,458
Patented Aug. 4, 1970

3,522,458
STARTING CIRCUIT FOR ENERGIZING A LOAD IN SYNCHRONISM WITH LINE FREQUENCY
James Howard Hufford, Moline, Ill., assignor, by mesne assignments, to Gulf & Western Industries, New York, N.Y., a corporation of Delaware
Filed Dec. 29, 1966, Ser. No. 605,856
Int. Cl. H03k *5/153*
U.S. Cl. 307—232
5 Claims

ABSTRACT OF THE DISCLOSURE

A starting circuit for energizing a load by a randomly actuatable switch so that the commencement of energization of the load is synchronized with line frequency. A capacitor charges when the switch is opened and a capacitor shunting transistor is nonconductive. The transistor is rendered alternately conductive and nonconductive at a frequency corresponding with line frequency. The capacitor commences to discharge as the transistor becomes conductive, and a circuit responds to this condition to energize the load.

---

Figure 1:
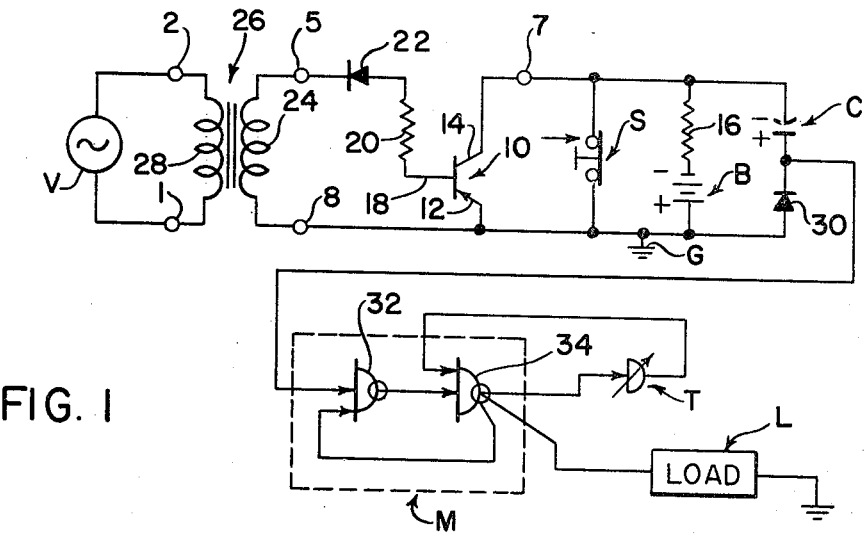

This invention is directed toward energizing a load in response to actuation of a randomly actuatable switch in such a manner that the commencement of energization of the load is synchronized with the frequency of an alternating current voltage source.

The invention is particularly applicable in conjunction with energizing timers and counters in synchronism with line frequency and will be described with reference thereto; although, it will be appreciated that the invention may be used in conjunction with energizing other loads in synchronism with the frequency of an alternating current voltage source.

Circuits have been known heretofore for energizing loads, such as timers or counters, in synchronism with line frequency. Such synchronizing circuits are normally quite complex and incorporate level detection circuitry or zero crossing detection circuitry. Due to their inherent complexity such circuits tend to be of large size, expensive to manufacture and require frequent maintenance.

The present invention is directed toward a starting circuit for energizing a load in synchronism with line frequency, and which is relatively noncomplex, is of small size and is economical to manufacture.

In accordance with the present invention, the starting circuit includes a capacitor and a direct current voltage source connected in parallel with the capacitor for charging same; first and second capacitor shunting circuits, each connected in parallel with the capacitor; the first shunting circuit including first switching means, such as a transistor, having a first condition and a second condition for respectively completing and disabling the first shunting circuit; switch control means coupled to an alternating current voltage source for alternately actuating the first switching means to its first and second conditions at a frequency corresponding with the frequency of the alternating current voltage source; the second shunting circuit including a randomly actuatable switching means, such as pushbutton switch, having a normal condition for completing the shunting circuit and an actuated condition for disabling the shunting circuit, whereby upon actuating the randomly actuatable switching means the capacitor will charge and discharge when the first switching means is respectively in its second and first condition; and, a load control means coupled to the capacitor for energizing the load as the capacitor commences to discharge, whereby the commencement of energization of the load occurs in synchronism with the frequency of the alternating current voltage source.

In accordance with a more limited aspect of the present invention, the first switching means takes the form of a transistor conductive and nonconductive at a frequency voltage source by a circuit which alternately renders the transistor conductive and nonconductive at a frequency corresponding with that of the alternating voltage source.

In accordance with a still more limited aspect of the present invention, the load control means includes a bistable circuit for normally providing a binary "0" output signal, and providing a binary "1" signal when the capacitor discharges to thereby energize the load only when a binary "1" output signal is developed.

The primary object of the present invention is to provide a relatively noncomplex starting circuit for energizing a load in synchronism with line frequency, and which circuit is of smaller size and is more economical to manufacture than similar circuits known heretofore.

A still further object of the present invention is to provide a starting circuit incorporating solid state circuitry for obtaining small unit size as well as economy of operation.

A still further object of the present invention is to provide a starting circuit incorporating a capacitor and a capacitor shunting transistor which is rendered alternately conductive and nonconductive at a frequency corresponding with line frequency.

Figure 2:
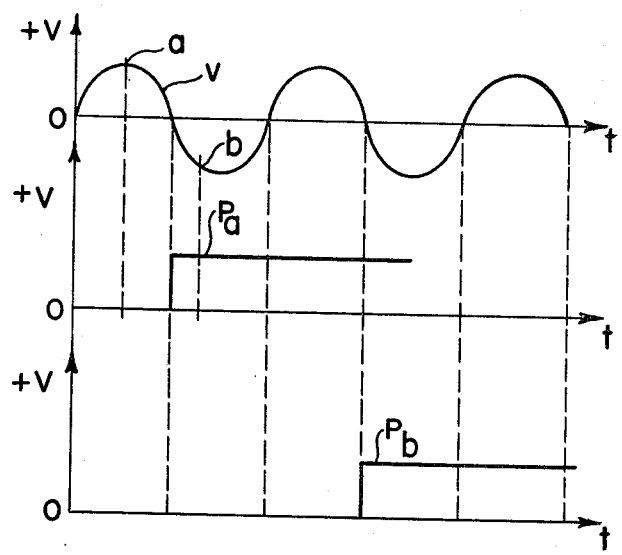

The foregoing and other objects and advantages of the invention will become apparent from the following description of preferred embodiment of the invention as read in connection with the accompanying drawings in which:

FIG. 1 is a schematic circuit diagram illustrating the preferred embodiment of the invention; and FIG. 2 is a graphical illustration of voltage wave forms showing the operation of the invention.

Referring now to the drawings, and more particularly to FIG. 1, there is illustrated the preferred embodiment of the invention which generally comprises a battery B connected in parallel with a capacitor C, a shunting circuit including a normally closed randomly actuatable pushbutton S, a capacitor shunting transistor 10, an alternating current voltage source V, a bistable multivibrator circuit M, a timer T, and a load L.

Transistor 10, as shown in FIG. 1, takes the form of a PNP transistor having its emitter 12 connected to ground and its collector 14 connected through a resistor 16 to the negative side of battery B. The base 18 of transistor 10 is connected through a resistor 20 and a diode 22, poled as shown in FIG. 1, to one end of a secondary winding 24 on a transformer 26. The other end of the secondary winding 24 is directly connected to emitter 12. The transformer 26 also includes a primary winding 28 which is connected across the alternating current voltage source V. Source V preferably takes the form of line voltage, such as 120 volts, 60 cycles per second.

The randomly actuatable switch S is shown in FIG. 1 as a normally closed pushbutton. However, it is to be appreciated that switch S may take other forms, such as a normally conductive transistor, since its function is to normally short circuit capacitor C. Capacitor C is connected in parallel with switch S as well as in parallel with battery B through a diode 30, poled as shown in FIG. 1. The junction of the positive side of capacitor C and the cathode of diode 30 is connected to the input side of a memory circuit taking the form of a bistable multivibrator circuit M. Multivibrator circuit M may take various forms, but preferably, as shown in FIG. 1, includes two RLT NOR circuits 32 and 34 connected together to define a bistable multivibrator circuit. The output circuit of circuit M, as taken from the output circuit of NOR circuit 34, is coupled through a timer T and thence to the input circuit of NOR circiut 34. Timer T may take various forms, such as an RC unijunction transistor relaxation oscillator circuit, which upon receipt of a binary "1" signal at its input circuit serves, after a predetermined period of time, to develop a binary "1" signal at its output circuit. The output circuit of NOR circuit 34 is also connected to a load L.

OPERATION

In operation, pushbutton switch S is normally closed, preventing capacitor C from being charged by battery B. If pushbutton switch S is opened at a point in time *a* (see FIG. 2) during the positive half cycle of the alternating current voltage V (when point 5 is at a positive potential with respect to point 8 in FIG. 1), PNP transistor 10 will be reversed biased. Capacitor C will charge in accordance with the polarity shown in FIG. 1. The positive side of capacitor C is clamped to ground potential by means of diode 30. This ground potential serves as a binary "0" signal for application to the input circuit of NOR circuit 32. Accordingly, the output circuit of NOR circuit 32 applies a binary "1" signal (a positive direct current voltage) to the input circuit of NOR circuit 34. Thus, the output circuit of NOR circuit 34 applies a binary "0" signal to timer T as well as to load L, and to the input circuit of NOR circuit 34. During the next negative half cycle of voltage V, i.e., when point 5 is at a negative potential with respect to point 8, transistor 10 becomes conductive, whereby the negative side of capacitor C is referenced to ground potential. Thus, the capacitor discharges into the input circuit of NOR circuit 32. This discharge of the capacitor serves to apply a binary "1" signal to NOR circuit 32. Accordingly, a binary "1" signal is applied by the output circuit of NOR circuit 34 to timer T, as well as to load L. The load L remains energized until timer T completes its timing function and applies a binary "1" signal to the input circuit of NOR circuit 34. During the timing period, the output circuit of NOR circuit 34 applies a binary "1" signal to the input circuit of NOR circuit 34 to maintain the bistable multivibrator circuit M in this stable condition.

From the foregoing, it will be appreciated that upon opening pushbutton switch S during the positive half cycle of voltage V at point *a* (see FIG. 2), both the timer T and the load L are energized at the commencement of the next negative half cycle of operation by a pulse P*a* taken, for example, at the output circuit of NOR circuit 34. It will also be appreciated that if pushbutton switch S is opened at point *b* (see FIG. 2) during the negative half cycle of voltage V, pulse P*b* would not occur until the commencement of the next negative half cycle of operation, thereby insuring that the timer commences its timing operation in synchronism with line frequency. The time duration of pulses P*a* and P*b* is dependent on the time delay period timed by timer T.

The invention has been described in connection with a particular preferred embodiment, but is not to be limited to same. Various modifications may be made without departing from the scope and spirit of the invention as defined by the appended claims.

Having thus described my invention, I claim:

1. A starting circuit for energizing a load in response to actuation of a randomly actuatable switching means in such a manner that the commencement of energization of said load occurs in synchronism with the frequency of an alternating current voltage source, said starting circuit comprising:
   a capacitor;
   a capacitor charging circuit including a direct current voltage source connected in parallel with said capacitor;
   first and second capacitor shunting circuits, each connected in parallel with said capacitor;
   said first shunting circuit including first switching means having a first condition and a second condition for respectively completing said first shunting circuit across said capacitor and through said switching means, and disabling said first shunting circuit;
   switch control means coupled to an alternating current voltage source for alternately actuating said first switching means to its first and second conditions at a frequency corresponding with the frequency of said alternating current voltage source;
   said second shunting circuit including a said randomly actuatable switching means having a normal condition for completing said second shunting circuit across said capacitor and through said randomly actuatable switching means and an actuated condition for disabling said shunting circuit, whereby upon actuating said randomly actuatable switching means said capacitor will charge and discharge when said first switching means is respectively in its second and first conditions; and,
   load control means coupled to said capacitor for energizing said load as said capacitor commences to discharge, whereby the commencement of energization of said load occurs in synchronism with the frequency of said alternating current voltage source.

2. A starting circuit as set forth in claim 1, wherein said first switching means is an electronic control means having first, second and control electrodes said first and said second electrodes being coupled in parallel with said capacitor, and said control electrode being adapted to be coupled to said alternating current voltage source.

3. A starting circuit as set forth in claim 2, wherein said randomly actuatable switching means includes a first and a second terminal coupled in parallel with said capacitor to thereby provide a said shunting circuit.

4. A starting circuit as set forth in claim 2, wherein said switch control means includes a circuit for connecting one side of said alternating current voltage source to said first electrode of said electronic control means and the other side of said source to said control electrode of said electronic control means.

5. A starting circuit for energizing a load in response to actuation of a randomly actuatable switching means in such a manner that the commencement of energization of said load occurs in synchronism with the frequency of an alternating current voltage source, said starting circuit comprising:
   a capacitor;
   a capacitor charging circuit including a direct current voltage source connected in parallel with said capacitor;
   first and second capacitor shunting circuits, each connected in parallel with said capacitor;
   said first shunting circuit including first switching means having a first condition and a second condition for respectively completing and disabling said first shunting circuit;
   switch control means coupled to an alternating current voltage source for alternately actuating said first switching means to its first and second conditions at a frequency corresponding with the frequency of said alternating current voltage source;
   said second shunting circuit including a said randomly actuatable switching means having a normal condition for completing said shunting circuit and an actuated condition for disabling said shunting circuit, whereby upon actuating said randomly actuatable switching means said capacitor will charge and discharge when said first switching means is respectively in its second and first conditions; and,
   load control means coupled to said capacitor for energizing said load as said capacitor commences to discharge, whereby the commencement of energization of said load occurs in synchronism with the frequency of said alternating current voltage source;

said load control means includes bistable means for normally providing a binary "0" output signal and providing a binary "1" output signal when said capacitor discharges to thereby energize said load.

References Cited

UNITED STATES PATENTS

| | | | |
|---|---|---|---|
| 3,329,837 | 7/1967 | Aewie | 307—262 |
| 3,414,737 | 12/1968 | Bowers | 307—246 X |

FOREIGN PATENTS 1,192,254  5/1965  Germany.

DONALD D. FORRER, Primary Examiner

S. T. KRAWCZEWICZ, Assistant Examiner

U.S. Cl. X.R.

307—246, 262, 269; 328—67, 151, 293